United States Patent
Sengupta et al.

(10) Patent No.: US 12,479,626 B1
(45) Date of Patent: Nov. 25, 2025

(54) ROBOT ASSISTED DIRECT-TO-PACK SORTATION SYSTEMS

(71) Applicant: Amazon Technologies, Inc., Seattle, WA (US)

(72) Inventors: Mainak Sengupta, Natick, MA (US); CJ Sturges, Nashville, TN (US)

(73) Assignee: Amazon Technologies, Inc., Seattle, WA (US)

( * ) Notice: Subject to any disclaimer, the term of this patent is extended or adjusted under 35 U.S.C. 154(b) by 771 days.

(21) Appl. No.: 17/852,843

(22) Filed: Jun. 29, 2022

(51) Int. Cl.
| | | |
|---|---|---|
| B65D 19/02 | (2006.01) | |
| B65D 19/10 | (2006.01) | |
| B65G 1/04 | (2006.01) | |
| B65G 1/06 | (2006.01) | |
| B65G 1/137 | (2006.01) | |
| B66F 9/06 | (2006.01) | |

(52) U.S. Cl.
CPC ............. B65D 19/02 (2013.01); B65D 19/10 (2013.01); B65G 1/0492 (2013.01); B65G 1/065 (2013.01); B65G 1/1378 (2013.01); B66F 9/063 (2013.01)

(58) Field of Classification Search
CPC ...... B65D 19/02; B65D 19/10; B65G 1/0492; B65G 1/1378; B66F 9/063
See application file for complete search history.

(56) References Cited

U.S. PATENT DOCUMENTS

| | | | | |
|---|---|---|---|---|
| 2,754,077 A | * | 7/1956 | Weber | B65D 19/02 217/43 A |
| 3,861,554 A | * | 1/1975 | Legg | B65D 19/10 292/342 |
| 4,173,289 A | * | 11/1979 | Nesti | B65D 19/10 220/1.5 |
| 4,595,510 A | * | 6/1986 | Winbladh | E02B 15/106 210/776 |
| 5,058,746 A | * | 10/1991 | Morgan, IV | B65D 19/18 220/4.32 |
| 2008/0135506 A1 | * | 6/2008 | Peters | B65D 19/10 211/49.1 |
| 2011/0255949 A1 | * | 10/2011 | Lemola | B65D 19/44 414/800 |
| 2012/0152946 A1 | * | 6/2012 | Gronholm | B65D 19/10 220/4.01 |
| 2020/0039687 A1 | * | 2/2020 | Kuhn | B65D 81/38 |
| 2022/0322608 A1 | * | 10/2022 | Demos | B21F 15/10 |

FOREIGN PATENT DOCUMENTS

| | | | | |
|---|---|---|---|---|
| CH | 1767460 A1 | * | 3/2007 | ............. B65D 19/18 |
| DE | 102005046265 B4 | * | 10/2023 | ............. B65D 19/18 |

\* cited by examiner

Primary Examiner — Thomas Randazzo
(74) Attorney, Agent, or Firm — Eversheds Sutherland (US) LLP

(57) ABSTRACT

Systems, methods, and computer-readable media are disclosed for robot assisted direct-to-pack sortation. In one embodiment, an example autonomous robot may include one or more forks, and a controller configured to determine that a first container is empty, transport the first container to a pick docking station, retrieve a second container from an induct station, wherein the second container is full, transport the second container to a buffer area, determine that the first container is full, and transport the first container to the buffer area.

20 Claims, 14 Drawing Sheets

ROBOT ASSISTED DIRECT-TO-PACK SORTATION SYSTEMS

BACKGROUND

As users increasingly make online purchases, fulfilment of such purchases and other orders may become increasingly complicated. For example, a fulfillment center may have output of upwards of one million packages per day. Such packages, as well as other containers, may be transported using trucks, trailers, and other equipment. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
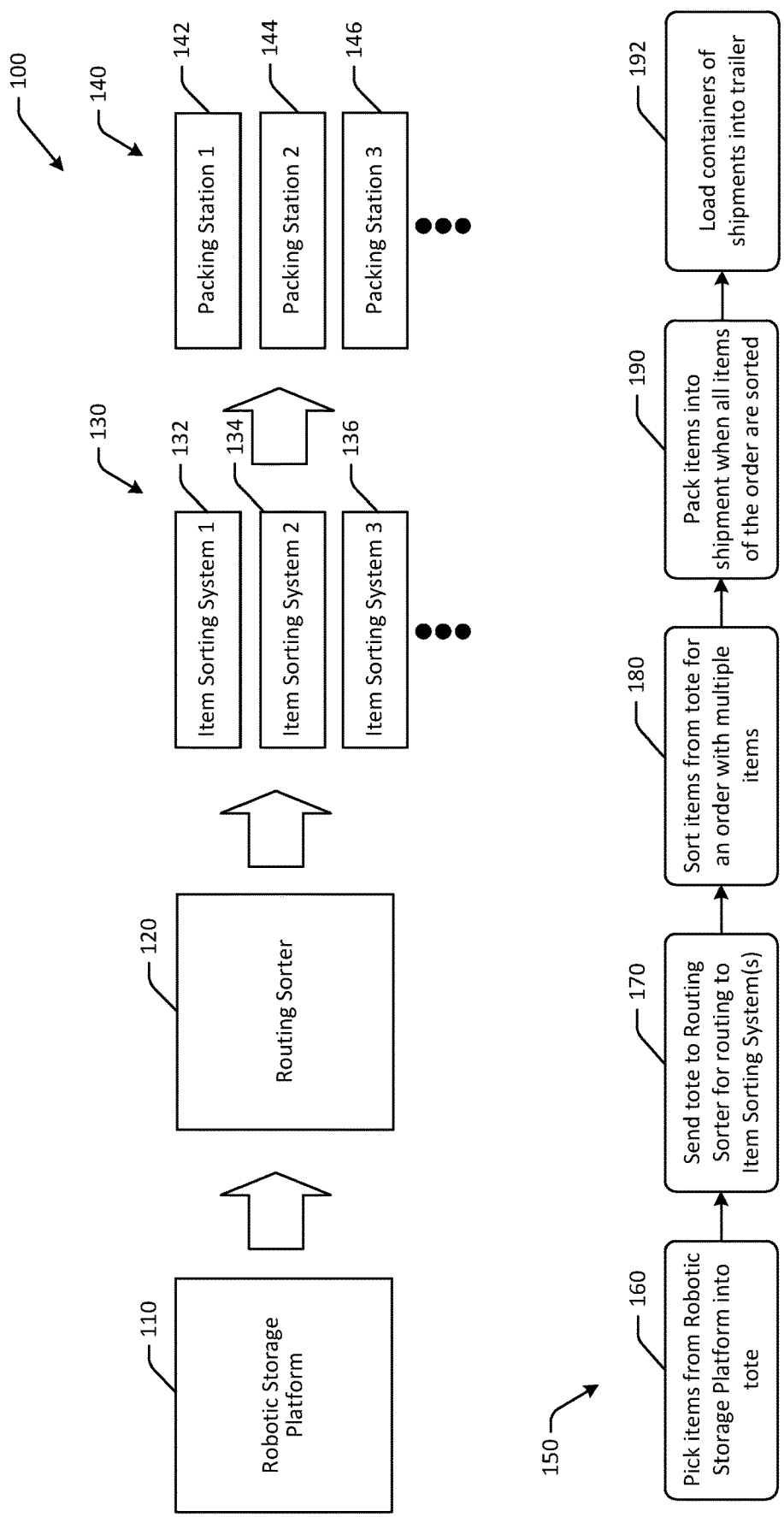
FIG. 1 is a hybrid schematic illustration of an example use case for robot assisted direct-to-pack sortation and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. Furthermore, packages and/or other containers may be loaded into trailers or other vehicles for transportation. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. Products in the same order may be directed to the same packing location for consolidation and subsequent packing. However, a tote or other container may include products that are to be sorted to multiple different packing locations, and the sortation process may be slowed by sheer volume of products that are to be processed and/or sorted. In addition, in some instances, items that are part of the same order may not all be in the same fulfillment center or other location. For example, a first product in an order of two items may be at a first fulfillment center, and a second product in the same order may be at a second fulfillment center. In such instances, instead of shipping the two items in the order separately, such as one from each fulfillment center, items may be transferred from one fulfillment center to another, and then aggregated with other items in the order and shipped together.

Bulky, large, heavy, and/or other similar items, such as packs of water bottles, bags of dog food, bulk rolls of paper towels, and so forth may be difficult to handle using robotic equipment, and may therefore by processed mostly manually. Such processing may be labor intensive. Embodiments of the disclosure eliminate the bulk of the manual effort using a combination of robotic drives and container docking solutions that automate the movement of such items between the pick and pack stages. In addition, some embodiments include a simplified flow path through facilities, which may be used to reduce the overall touch points with such items, and to create buffers that allow for continuous packing without overflows and backlogs at various stations throughout the fulfillment center.

Some embodiments include autonomous robots that are configured to operate similar to pallet trucks or pallet jacks (e.g., with one or more forks, etc.), and are configured to retrieve and transport containers, such as cages or other types of containers, autonomously. Some autonomous vehicles or autonomous robots (used interchangeably herein) may be configured to determine whether a particular cage is ready for transport based at least in part on whether a container is full. As a result, manual effort can be redirected elsewhere. In addition, by automating processing of bulky items, an end-to-end process of filling and transporting bulky items can be automated, resulting in overall increased throughput and improved system efficiency.

Embodiments may therefore increase throughput and speed of consolidating containers, consolidating items for multi-item orders and/or consolidating packages or containers that are destined for certain related destinations, such as other fulfillment centers. Some embodiments include optimized process flows for processing of orders at fulfillment centers, as well as process flows or equipment to increase speed of consolidating products in a multi-item order and/or speed of sorting packages. As a result, throughput of fulfillment centers may be improved, and/or logistics of fulfillment center operations may be less complicated.

Referring to FIG. 1, an example use case 100 for robot assisted direct-to-pack sortation and an example process flow is depicted in accordance with one or more embodiments of the disclosure. Although discussed in the context of online orders, other embodiments may be directed to any suitable use case where products are picked and sorted, or packages or containers are sorted, such as instances where users may pick up orders rather than receiving a shipment, instances where items are aggregated for transport to another fulfillment center, and so forth.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system machine. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 120, totes including products that have been picked may be routed to the appropriate or designated item sorting system. For example, the routing sorter 120 may optionally determine an identifier associated with the tote, and may determine one or more item sorting systems to which the tote is to be routed using the identifier or using another factor, such as sortation system load. The routing sorter 120 may route or direct the tote to an item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. In another example, the containers may be stacked, closed, or otherwise packed for shipment to another fulfillment center.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted. At a fifth block 192, containers of the shipments may be loaded into a trailer. For example, the shipments may be placed into carts, gaylords, boxes, totes, or other types of containers, and the containers may be loaded into one or more trailers for transport. Embodiments of the disclosure may be used to process items that are bulky and may be processed outside the automated nature of the facility depicted with respect to FIG. 1.

Figure 2:
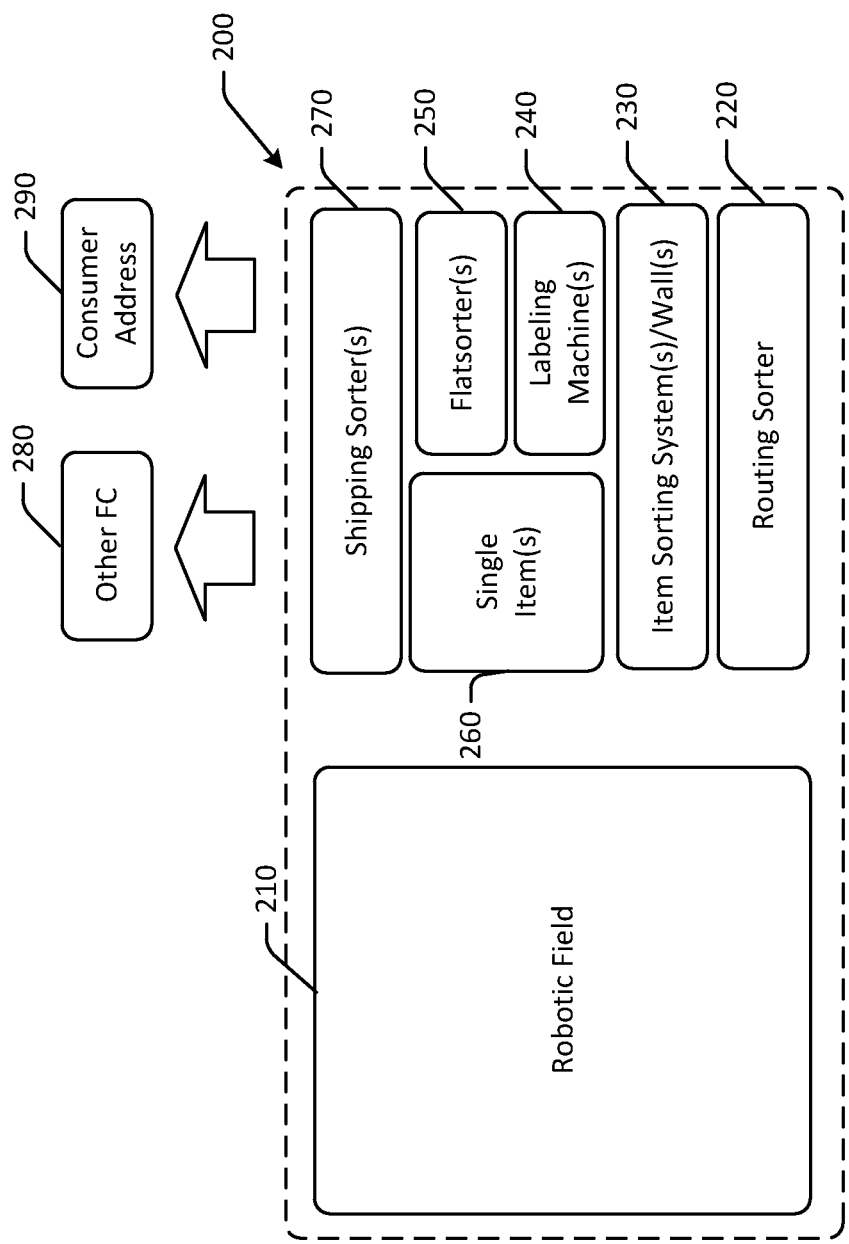
FIG. 2 is a hybrid schematic illustration of an example use case for robot assisted direct-to-pack sortation systems in accordance with one or more embodiments of the disclosure.

FIG. 2 is a hybrid schematic illustration of an example use case for robot assisted direct-to-pack sortation systems in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into containers or chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers and/or containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour or more. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual processes. For example, manual induction of products from a tote to a sorter machine may be a bottleneck that is avoided by the systems and methods described herein. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"× 14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of chutes or containers (e.g. induct individual items from a container that has multiple items, and place the inducted items into the appropriate chute to be routed to a container, where chutes or containers are associated with multi-item orders). The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers 280, packages addressed to consumer addresses 290, and so forth.

Accordingly, in some embodiments, item sorting systems may be arranged in rows and may receive assigned totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may be assigned to a particular item sorting system machine. Induct stations can be replaced with item sorting system machines.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Embodiments of the disclosure include robot assisted direct-to-pack sortation systems. The systems and methods described herein may include automated transport and/or sortation of bulky items. As a result, efficiency of processing bulky may be improved. Certain embodiments may improve processing speed and/or throughput of fulfillment centers. Certain embodiments may improve performance of mechanical equipment for sortation and/or consolidation of items for multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 3:
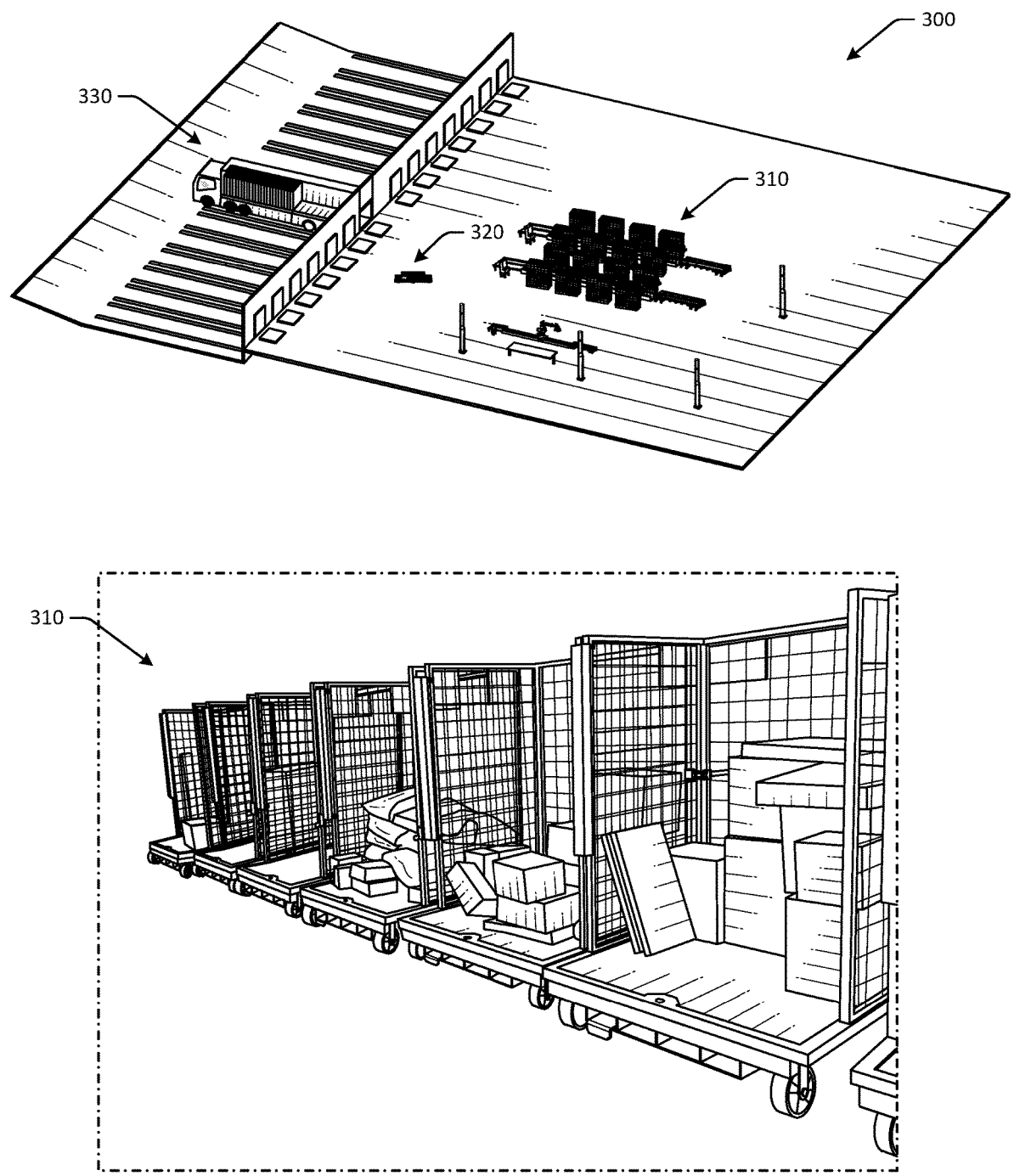
FIG. 3 is a schematic illustration of a fulfillment center and an example container being transported by an autonomous robot in accordance with one or more embodiments of the disclosure.

FIG. 3 is a schematic illustration of a fulfillment center 300 and an example container being transported by an autonomous robot in accordance with one or more embodiments of the disclosure. Other embodiments may include additional or fewer components. The illustration of FIG. 3 is not to scale, and may not be illustrated to scale with respect to other figures. The system illustrated in FIG. 3 may be the same system discussed with respect to FIGS. 1-2.

In FIG. 3, a system for robot assisted direct-to-pack sortation is depicted in an overhead perspective view. At a first location 310, containers, such as containers may be transported to packing stations, where packed items are loaded into a trailer 330. Individual containers may be loaded onto autonomous robots 320 and transported throughout the facility. The autonomous robot 320 may be any suitable vehicle such as an autonomous vehicle.

The autonomous robot 320 may load a container 310 onto the autonomous robot 320 by positioning at least a portion of the autonomous robot 320, such as one or more forks, underneath the container 310. In some embodiments, the autonomous robot 320 may be entirely under the container 310 before lifting the container 310 off a floor surface and transporting the container 310.

The autonomous robot 320 may be configured to navigate the facility autonomously. The autonomous robot 320 may include a controller or other type of computer system for autonomous navigation, such as memory comprising computer-executable instructions, and one or more computer processors configured to access the memory and execute the computer-executable instructions for autonomous navigation.

The autonomous robot 320 may be configured to retrieve and transport containers. Accordingly, in some embodiments, the autonomous robot 320 may have one or more cameras disposed at a front and/or rear end of the autonomous robot, a lidar sensor, a force sensor, and a controller. The force sensor may be disposed between a top side of the autonomous robot 320 and a bottom side of a container being transported by the autonomous robot 320.

Figure 4:
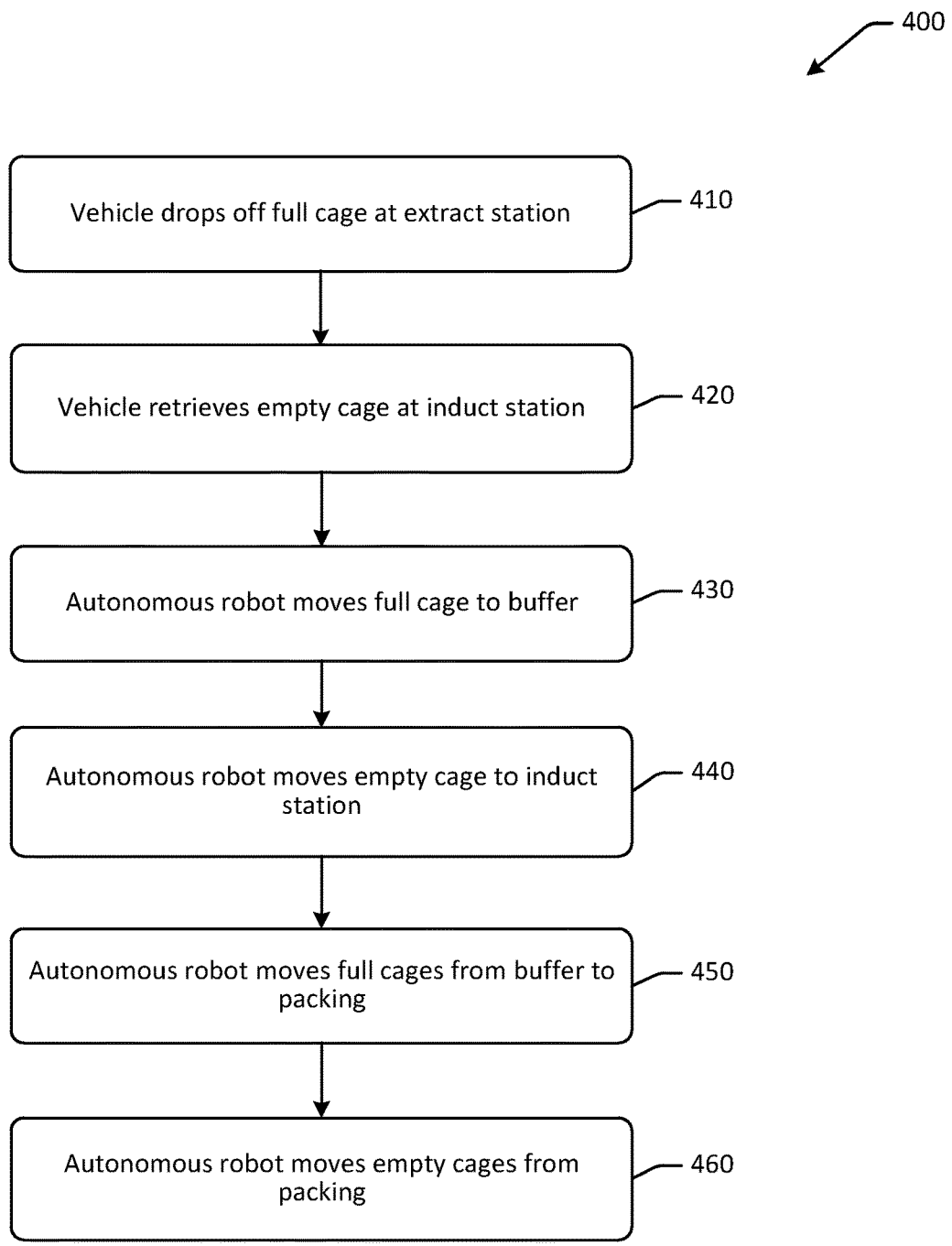
FIG. 4 is a schematic illustration of an example process flow for robot assisted direct-to-pack sortation in accordance with one or more embodiments of the disclosure.

FIG. 4 is a schematic illustration of an example process flow 400 for robot assisted direct-to-pack sortation in accordance with one or more embodiments of the disclosure. Other embodiments may include additional or fewer operations. The operations of FIG. 4 may be performed in any order and some of the operations may be performed at least partially concurrently. Some or all of the operations may be performed across a distributed computing environment.

In FIG. 4, a process flow 400 may be executed by a local or remote controller of an autonomous robot or a connected computer system. The autonomous robot may include memory having computer-executable instructions, and one or more computer processors configured to access the memory and execute the computer-executable instructions to perform one or more operations.

At block 410, the autonomous robot may determine a first drop off location for a full container is at an extract station. An extract station may be a location at which items are placed into container or other container after being extracted from inventory. Items may be resorted based at least in part on order contents. For example, items in the same order may be aggregated.

At block 420, the autonomous robot may retrieve an empty container at an induct station. For example, while the first container is being loaded at the extract station, the autonomous robot may move to the induct station and retrieve a second container that is empty after items from the container have been inducted and stored in inventory. The autonomous robot may therefore be in continuous motion while items are being processed from containers.

At block 430, the autonomous robot may move a full container to a buffer area or a designated waiting space in the facility. The full container may be retrieved from the extract station, where the container is loaded with items from inventory. The buffer area may be a waiting zone between extract and packing.

At block 440, the autonomous robot may move an empty container to the induct station. For example, a continuous supply of empty containers may be moved to induct and/or extract stations as the contents of containers are processed.

At block 450, the autonomous robot may move full containers from the buffer area to a packing station. As containers are processed at the packing station, the autonomous robot may continuously provide a steady supply of containers to the packing station for packing of items.

At block 460, the autonomous robot may move empty containers from packing stations to various other locations, such as the buffer area, the induct station, the extract station, or another location as needed.

The autonomous robot may therefore be part of a system to sort bulky items. The system may include a pick docking station, the induct station, the buffer area, and the packing station. The system may include a first container having fencing along three walls, an open fourth wall (as depicted in the example of FIG. 3), and a platform having slots. The autonomous robot may have forks configured to engage the slots on the platform of the first container, where the autonomous robot is configured to raise and transport the first container using the forks. The autonomous robot may have a controller configured to determine that a first container is empty. The autonomous robot may transport the first container to a pick docking station or an extract station. The autonomous robot may retrieve a second container from an induct station, where the second container is full. The autonomous robot may transport the second container to a buffer area, and then may transport the second container to a packing station. The autonomous robot may determine that the first container is full, such as via one or more sensors (e.g., cameras, Lidar, etc.) and/or by receiving a notification the first container is full, and may retrieve a third container from the buffer area, where the third container is empty. The autonomous robot may transport the third container to the pick docking station or extract station, and may transport the first container to the buffer area. The second container may be transported while the first container is being filled.

In some embodiments, containers may bypass the buffer area or waiting zone, such as containers carrying items having a high time sensitivity metric. Time sensitivity metrics may include time to ship values (e.g., the less time before an item ships, the higher its time sensitivity metric may be, etc.), perishable items, order delay metrics, guaranteed delivery times, and so forth. The autonomous robot may determine a time sensitivity metric associated with a fourth container, and may transport the fourth container directly to the packing station while bypassing the buffer area based at least in part on the time sensitivity metric.

FIGS. 5A-5E are schematic illustrations of an example robot assisted direct-to-pack sortation process 500 at various stages in accordance with one or more embodiments of the disclosure. Other embodiments may include additional or fewer components. The illustrations of FIGS. 5A-5E may not be to scale, and may not be illustrated to scale with respect to other figures. The example illustrated in FIGS. 5A-5E may be performed using the autonomous robots discussed with respect to FIGS. 1-4.

Figure 5A:
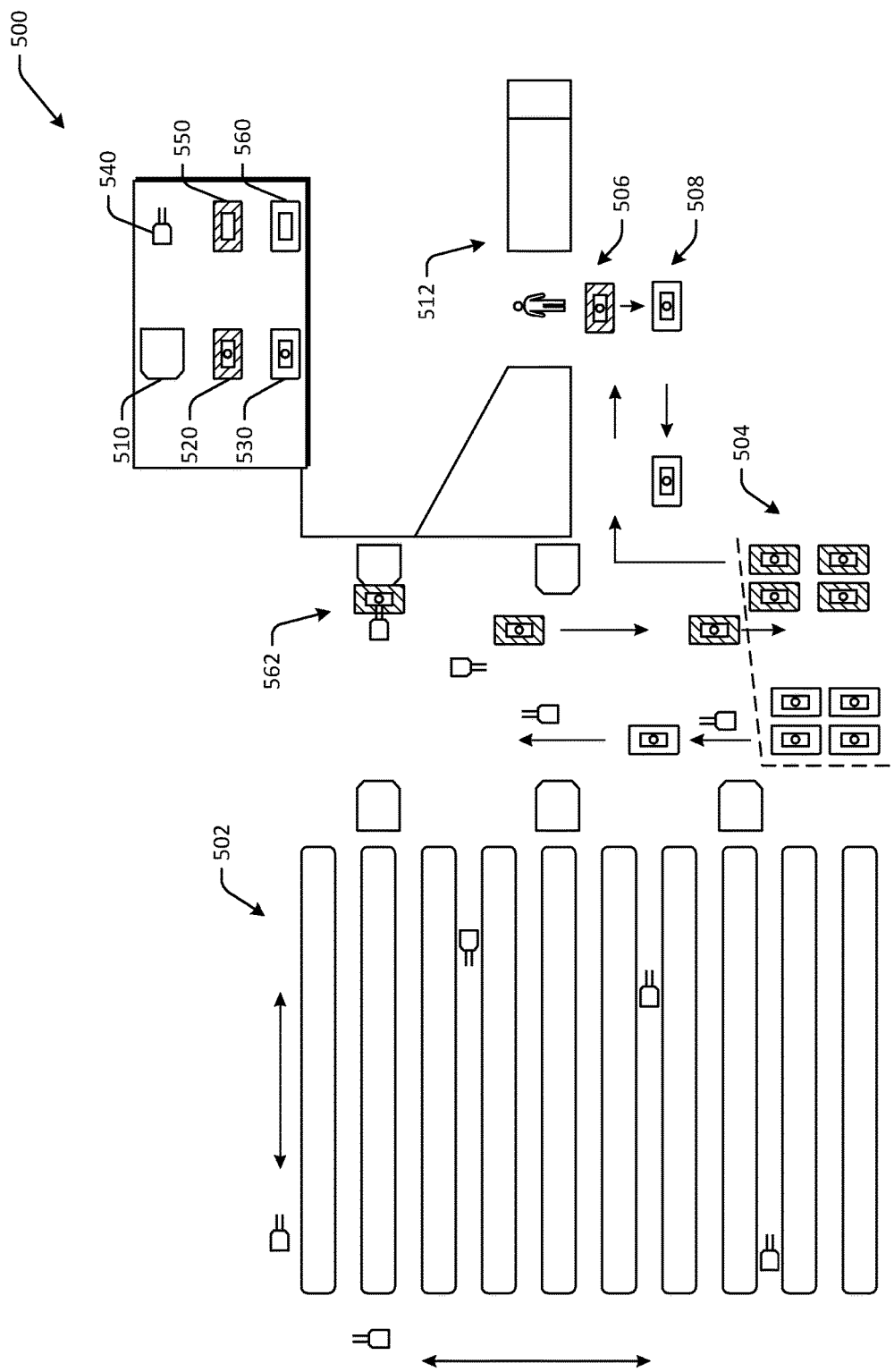
FIGS. 5A-5E are schematic illustrations of an example robot assisted direct-to-pack sortation process at various stages in accordance with one or more embodiments of the disclosure.

In FIG. 5A, a top view of a facility is depicted, where inventory racking 502 is depicted. One or more autonomous robots 540 may move autonomously about the facility. The facility may include one or more induct stations 510 and extract stations 510, where induct stations 510 are adjacent to the inventory racking 502 and extract stations 510 are depicted adjacent to a pack station 512. The facility may include a buffer area 504 where empty and full containers may be placed during a wait in between processing. In FIG. 5A, full containers being transported by an autonomous robot are represented with reference number 520, empty containers being transported by an autonomous robot are represented with reference number 530, autonomous robots are represented with reference number 540, full containers are represented with reference number 550, and empty containers are represented with reference number 560.

Figure 5B:
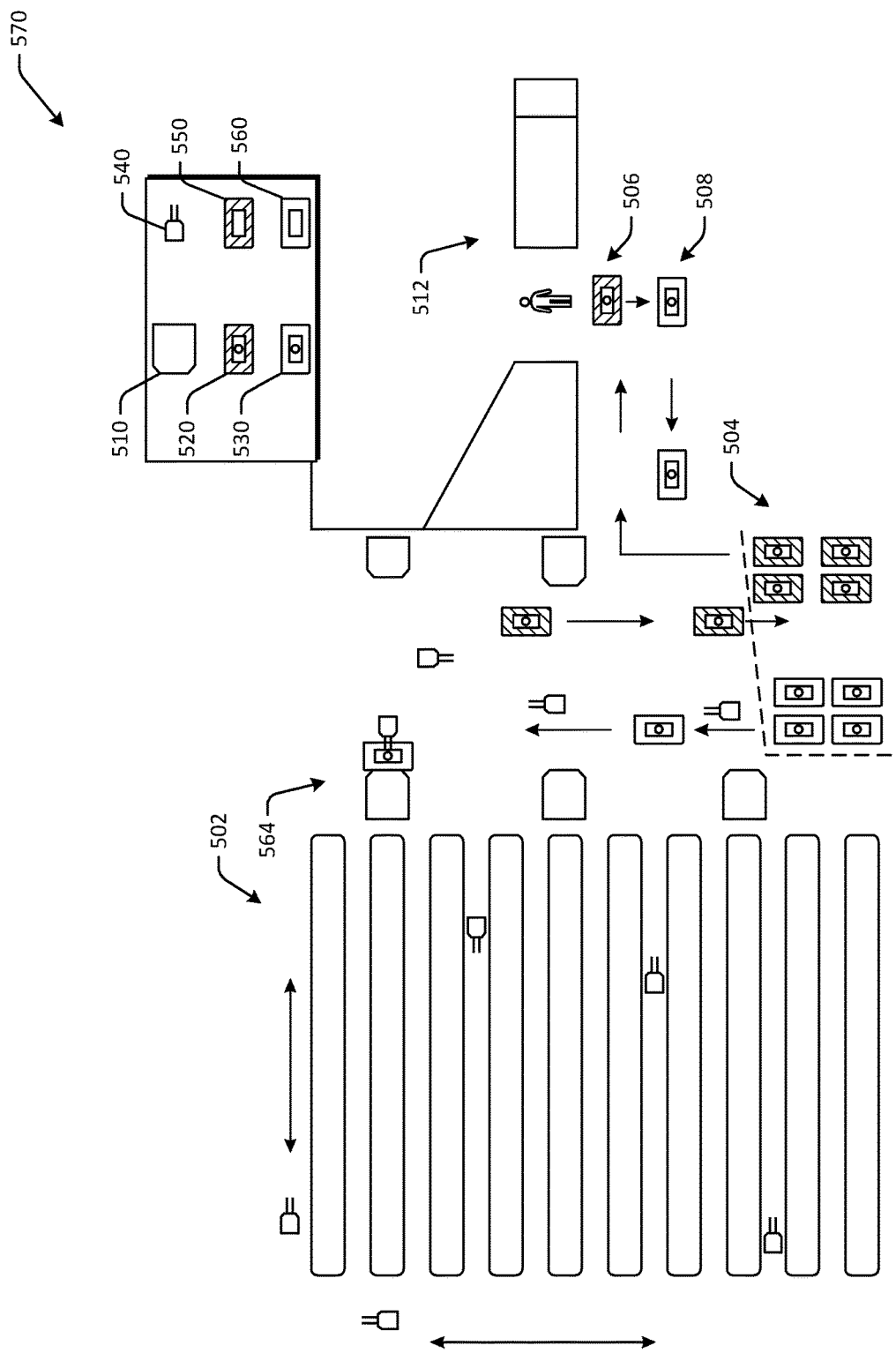
Figure 5C:
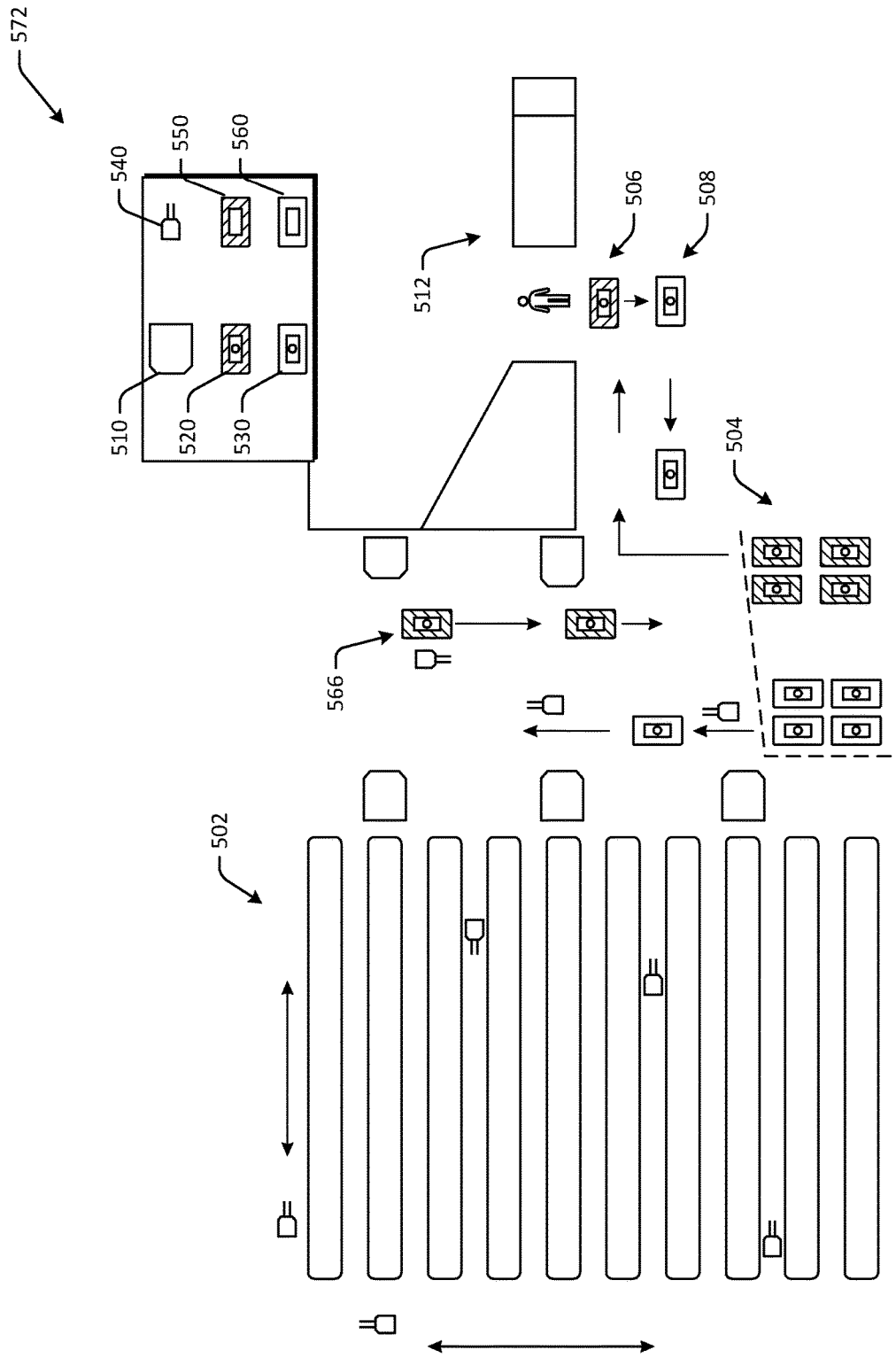
Figure 5D:
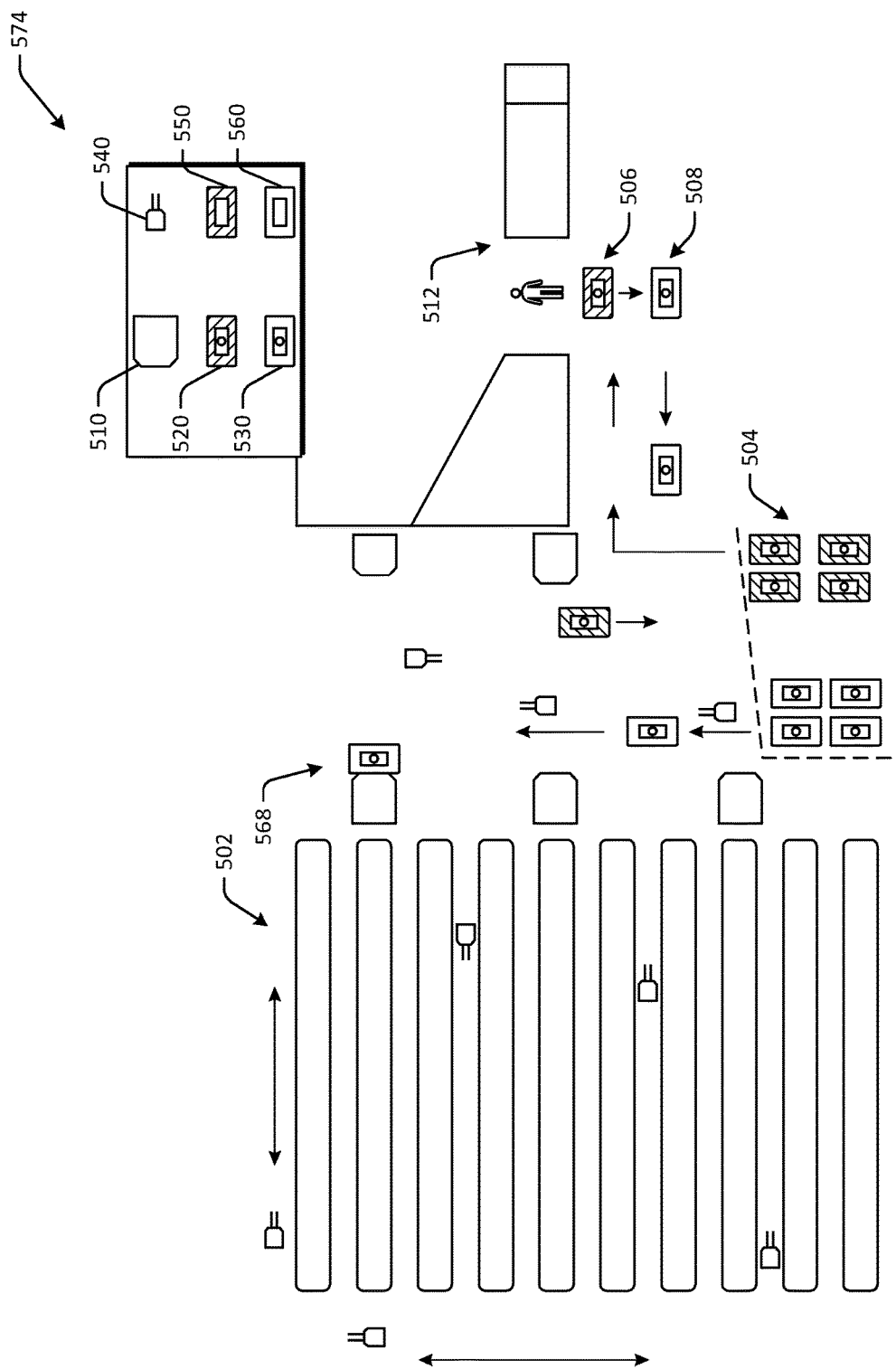
Figure 5E:
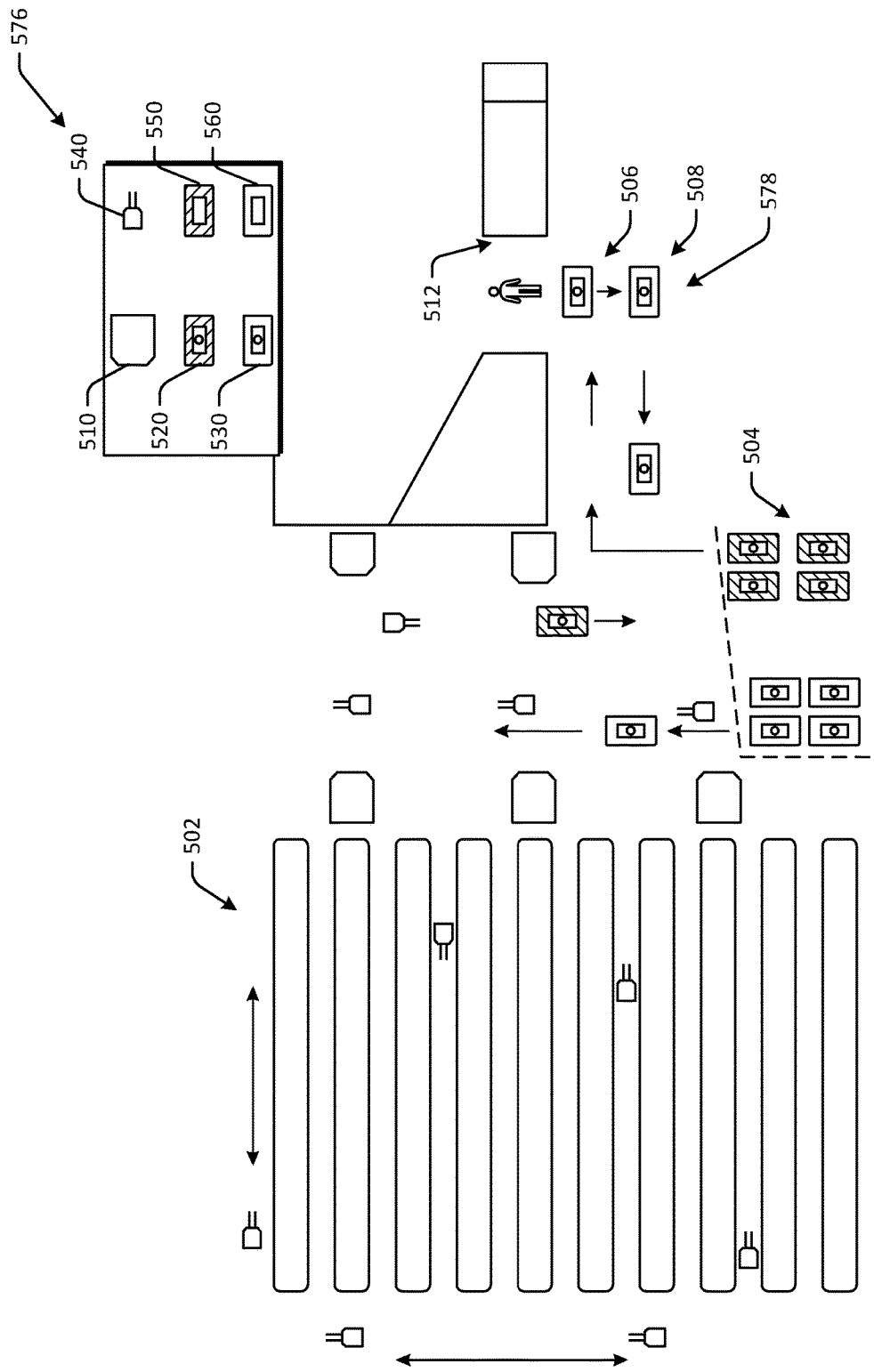

In FIG. 5A, at operation 562, an autonomous robot 540 may drop off a full container at an extract station. At a packing station, a full container 506 may be packed and empty container 508 may be returned to the buffer or placed back into processing. In FIG. 5B, the facility is depicted without the empty container pick 570. At operation 564, the autonomous robot 540 may retrieve an empty container at an induct station 510. In FIG. 5C, the facility is depicted with a full container drive pickup 572. At operation 566, the autonomous robot 540 may move a full container to the buffer area 504. In FIG. 5D, the facility is depicted with an empty container drive placement. At operation 568, the autonomous robot 540 may place an empty container at an induct station 510. In FIG. 5E, the facility is depicted with full and empty containers in the packing station area 512. At operation 578, the autonomous robot 540 may transport full containers from the buffer area 504 and/or extract stations 510, and may transport empty containers to the buffer area or back into processing.

The system may therefore include an autonomous robot having one or more forks, and a controller that may include memory comprising computer-executable instructions and one or more computer processors configured to access the memory and execute the computer-executable instructions to: determine that a first container is empty, transport the first container to a pick docking or extract station, retrieve a second container from an induct station, where the second container is full, transport the second container to a buffer area, determine that the first container is full, and transport the first container to the buffer area. The second container may be transported while the first container is being filled. The controller may be further configured to determine that a packing station has an opening, and transport the second container from the buffer area to the packing station. The controller may be further configured to retrieve a third container from the buffer area, where the third container is empty and transport the third container to the pick docking station.

In some embodiments, the autonomous robot may be in continuous motion between stations. The second container may be full of items individually weighing at least 20 pounds, such as at least 50 pounds, or other bulky type items.

Movement of the autonomous robot 540 and/or containers may be coordinated with a fleet of autonomous robots 540. Embodiments may eliminate a container changeover process, and reduce unknown idle time by over 80%, allowing manual effort to be redirected elsewhere.

FIGS. 6A-6D are schematic illustrations of an example autonomous robot and station 600 in different views in accordance with one or more embodiments of the disclosure. Other embodiments may include additional or fewer components. The illustration of FIGS. 6A-6D may not be to scale, and may not be illustrated to scale with respect to other figures. The example illustrated in FIGS. 6A-6D may be the same station discussed with respect to FIGS. 1-5E.

Figure 6A:
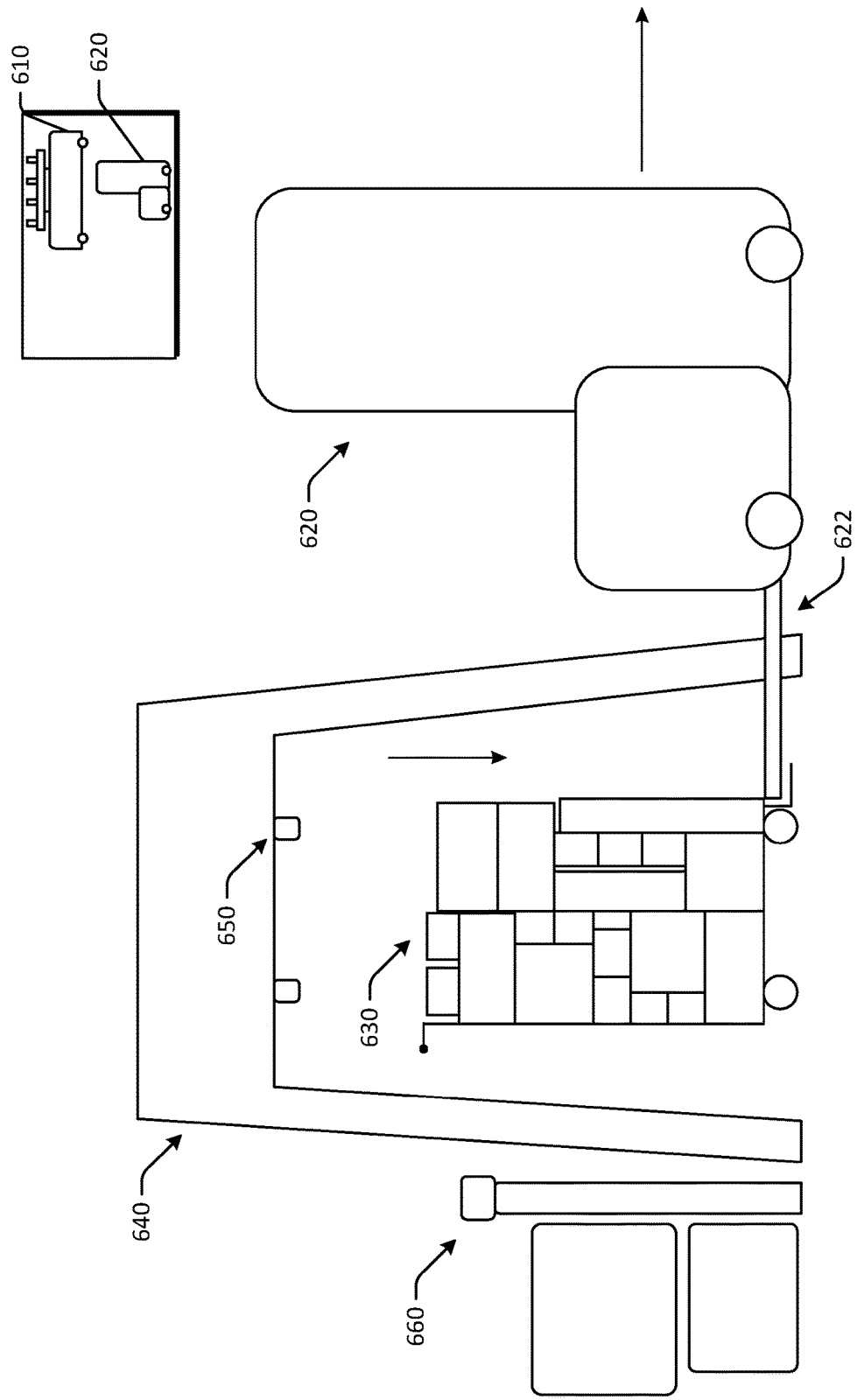
FIGS. 6A-6D are schematic illustrations of an example autonomous robot and station in different views, along with various embodiments of an autonomous robot, in accordance with one or more embodiments of the disclosure.

In FIG. 6A the station 600 is depicted in side view. A first autonomous robot 610 and a second autonomous robot 620 with forks 622 may be at the station 600. A full container 630 may be dropped off at the station 600 via the second autonomous robot 620. The station 600 may include sensor clusters 650 and a support 640. One or more personnel detection devices 660 may be disposed adjacent to the support 640. The second autonomous robot 620 may drop off the container 630 and may drive away.

Figure 6B:
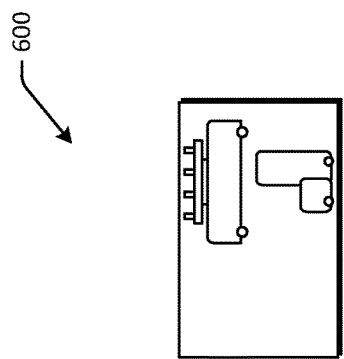
Figure 6B:
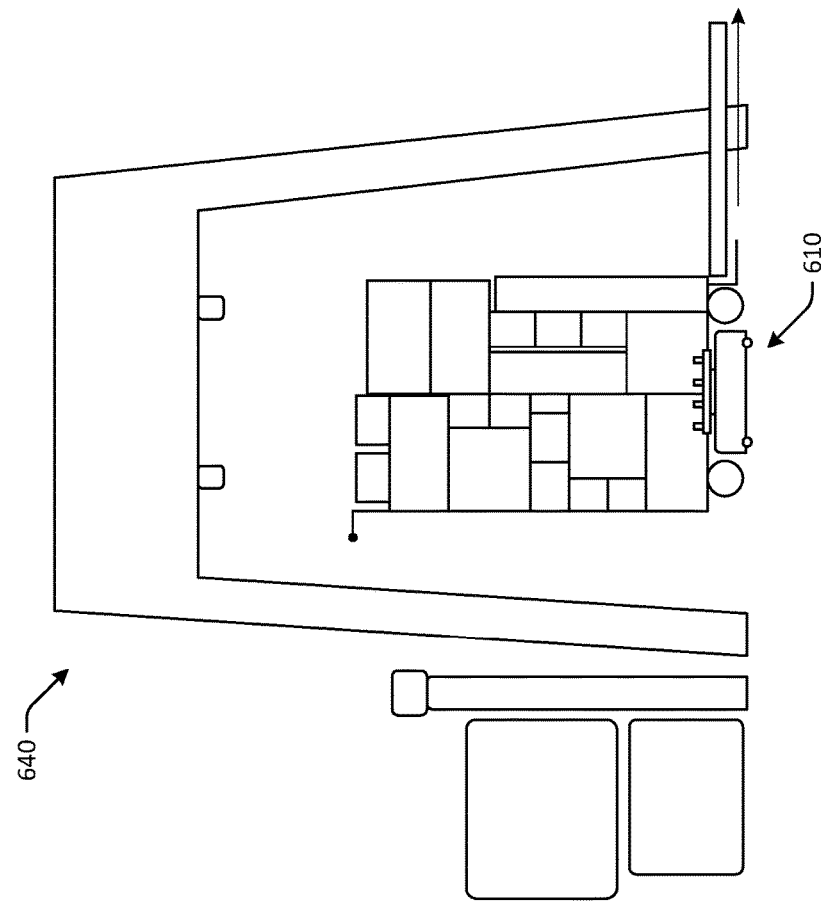
Figure 6C:
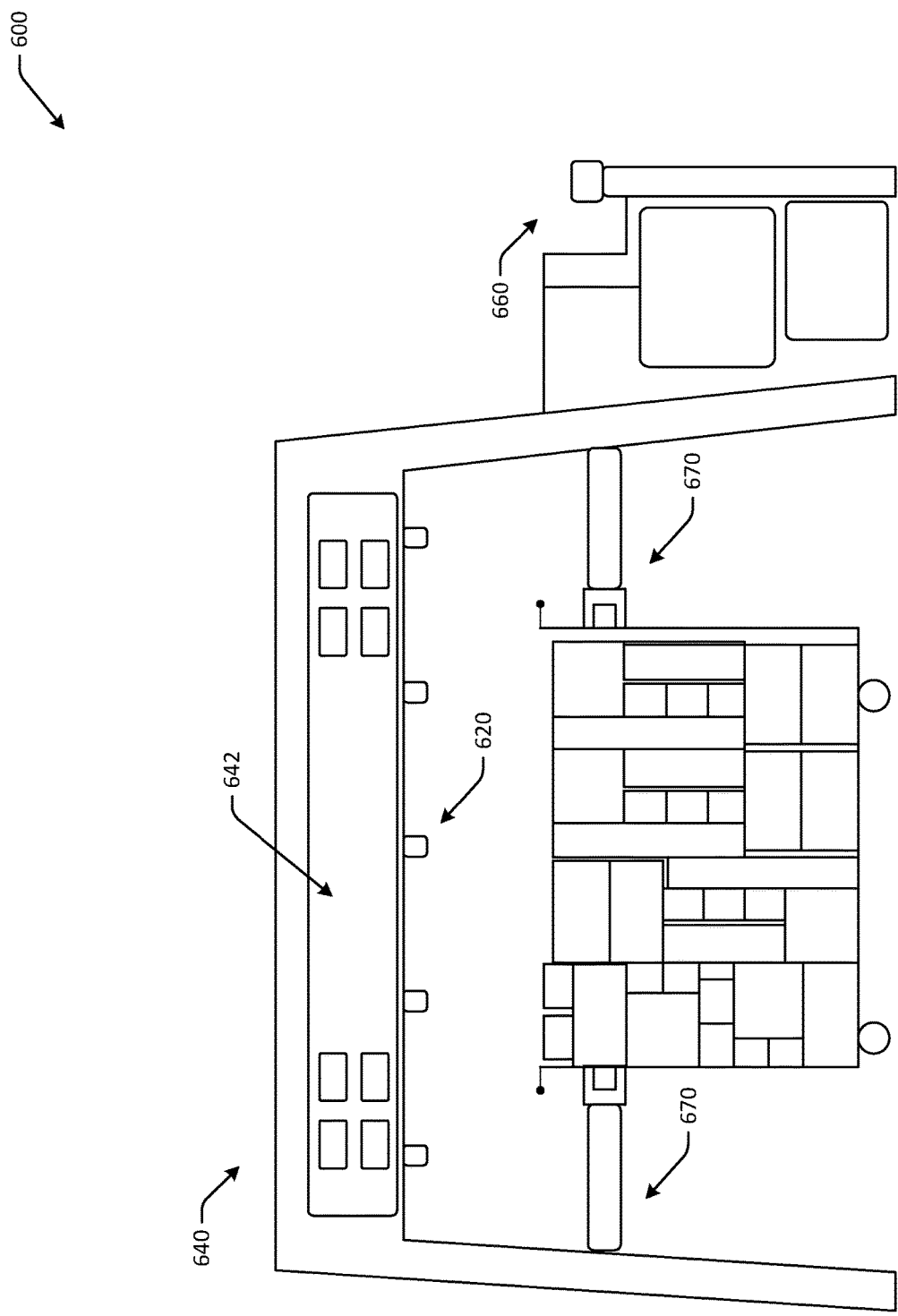

In FIG. 6B, the station 600 is depicted in side view. The first autonomous robot 610 may retrieve the full container 630 and transport the full container 630 for downstream processing. In FIG. 6C, the station 600 is depicted in front view. The station 600 may include a digital display 642, sensor clusters 620, and one or more locking arms 670 to secure containers. The station may therefore be configured to receive and secure containers during induction, extraction, packing, and so forth.

Figure 6D:
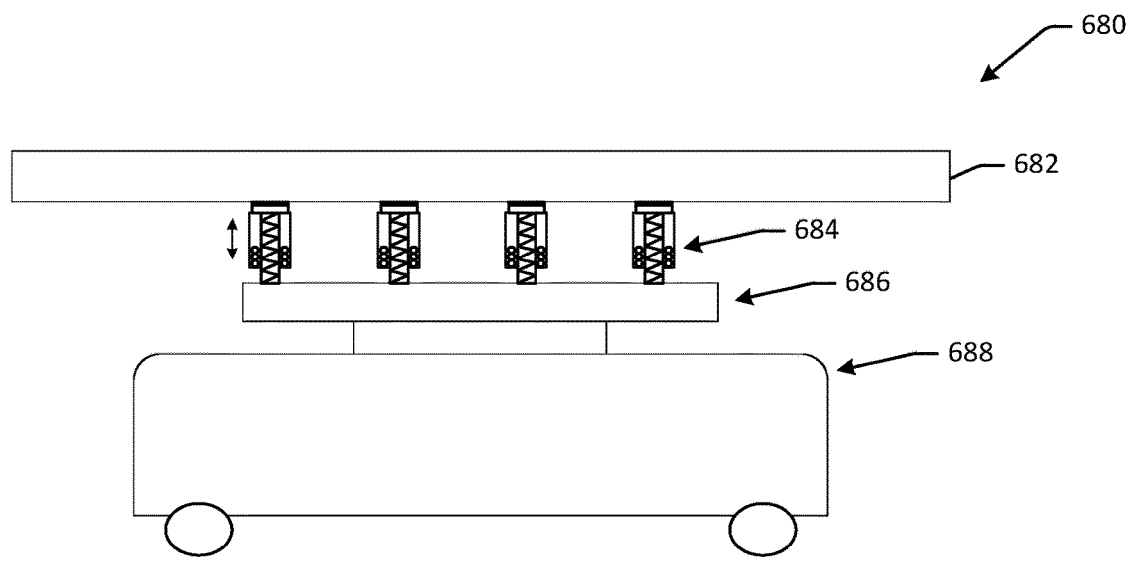
Figure 6D:
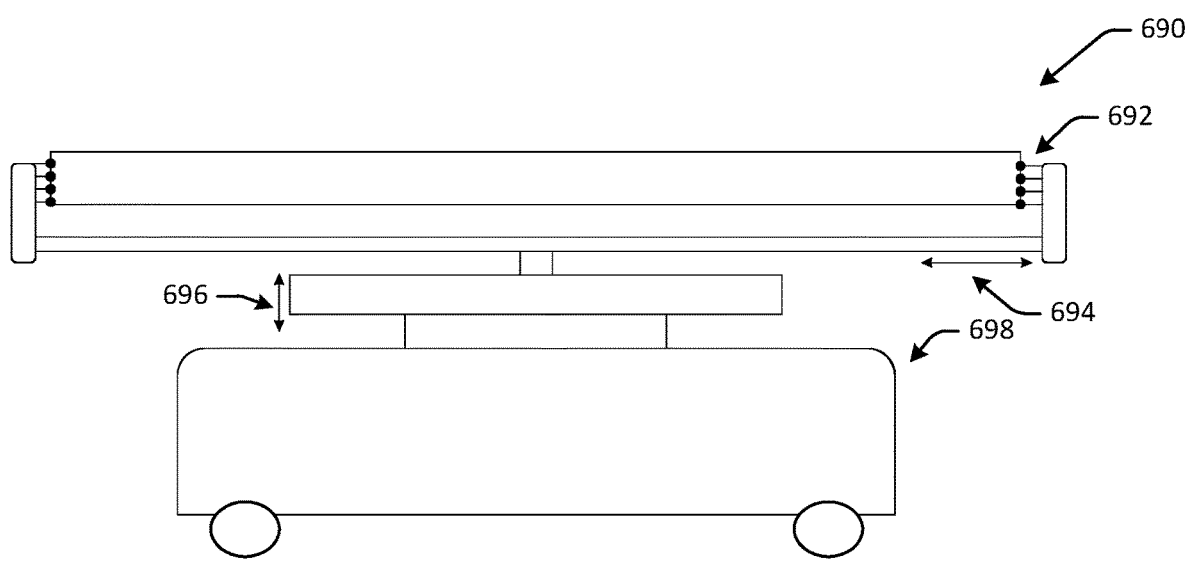

FIG. 6D depicts embodiments of an autonomous robot that may be used to transport containers. For example, a first autonomous robot 680 may include a drive chassis 688 to which a drive turntable 686 is coupled. The first autonomous robot 680 may include one or more independent grippers 684 that support a bottom surface of a container 682. The independent grippers 684 may be configured to allow the first autonomous robot 680 to adjust suction pressure depending on friction between a gripper and the container 682. In some embodiments, the independent grippers 684 may be configured to articulate in a vertical direction and may use suction to grip one or more surfaces of the container 682. The independent grippers 684 may include roller bearings for frictionless movement, and may include bellows or spring loaded components to allow for quick engagement and disengagement with the container 682.

In another embodiment, a second autonomous robot 690 may include a drive chassis 698 to which a drive turntable 696 is coupled. The drive turntable 696 may be configured to articulate vertically to contact a surface of a container 692. The second autonomous robot 690 may include one or more end grippers 694 that support bottom and/or side surfaces of the container 692. The end grippers 694 may be configured to slide to engage side surfaces of the container 692, where the sliding ends may include grips on one or more, or all four, sides of the container 692, so as to allow the second autonomous robot 690 to secure the container 692. The end grippers 694 may include one or more independent suction cups configured to adjust suction pressure depending on surface friction. In some embodiments, the end grippers 694 may be configured to articulate in a lateral direction and may use suction to grip one or more surfaces of the container 692.

One or more operations of the methods, process flows, or use cases of FIGS. 1-6D may have been described above as being performed by a user device, or more specifically, by one or more program module(s), applications, or the like executing on a device. It should be appreciated, however, that any of the operations of the methods, process flows, or use cases of FIGS. 1-6D may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6D may be described in the context of the illustrative devices, it should be appreciated that such operations may be implemented in connection with numerous other device configurations.

The operations described and depicted in the illustrative methods, process flows, and use cases of FIGS. 1-6D may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6D may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
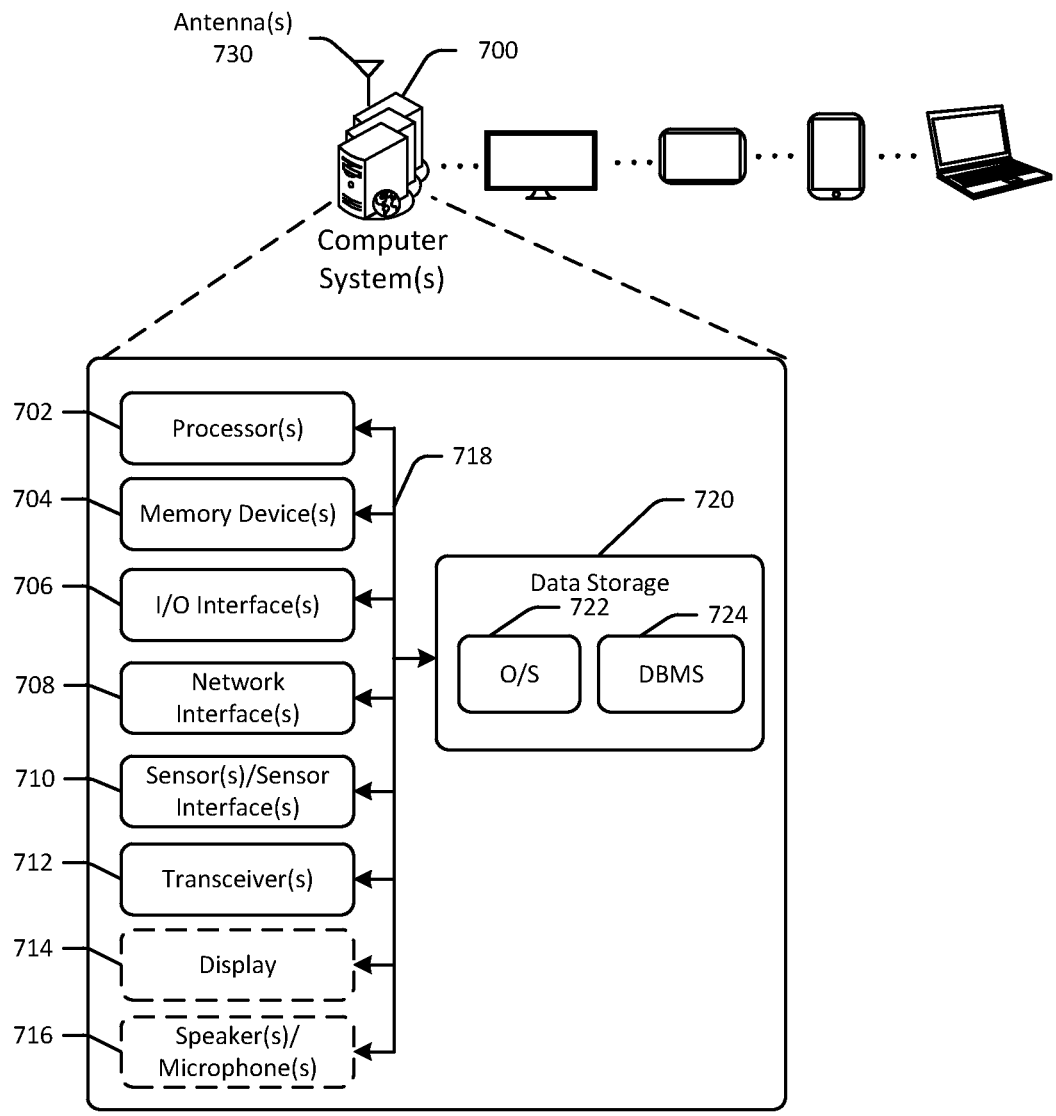
FIG. 7 schematically illustrates an example architecture of a computer system associated with an autonomous robot in accordance with one or more embodiments of the disclosure.

FIG. 7 is a schematic block diagram of one or more illustrative computer system(s) 700 in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for a computer system used in conjunction with any one of the system(s) of FIGS. 1-6D.

The computer system(s) 700 may be configured to communicate with one or more servers, user devices, or the like. The computer system(s) 700 may be configured to cause the autonomous vehicle system(s) to identify containers, retrieve containers, transport containers, determine container capacity, determining Lidar or other sensor measurements, guide autonomous robots, determine navigation paths, and so forth.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antennas may include directional antennas, non-directional antennas, dipole antennas, folded dipole antennas, patch antennas, multiple-input multiple-output (MIMO) antennas, or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving—potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s)

accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system to sort bulky items, the system comprising:
   a first container comprising fencing along three walls, an open fourth wall, and a platform having slots;
   an autonomous robot comprising forks configured to engage the slots on the platform of the first container, wherein the autonomous robot is configured to raise and transport the first container; and
   a controller configured to:
   determine that the first container is empty;
   cause the autonomous robot to transport the first container to a pick docking station;
   cause the autonomous robot to retrieve a second container from an induct station, wherein the second container is full;
   cause the autonomous robot to transport the second container to a buffer area;
   cause the autonomous robot to transport the second container to a packing station;
   determine that the first container is full;
   cause the autonomous robot to retrieve a third container from the buffer area, wherein the third container is empty;
   cause the autonomous robot to transport the third container to the pick docking station; and
   cause the autonomous robot to transport the first container to the buffer area.

2. The system of claim 1, wherein the second container is transported while the first container is being filled.

3. The system of claim 1, wherein the controller is further configured to:
   determine a time sensitivity metric associated with a fourth container; and
   transport the fourth container directly to the packing station while bypassing the buffer area based at least in part on the time sensitivity metric.

4. The system of claim 1, wherein the system comprises the pick docking station, the induct station, the buffer area, and the packing station.

5. An autonomous robot comprising:
   memory comprising computer-executable instructions; and
   one or more computer processors configured to access the memory and execute the computer-executable instructions to:
   determine that a first container is empty;
   transport the first container to a pick docking station;
   retrieve a second container from an induct station, wherein the second container is full;
   transport the second container to a buffer area;
   determine that the first container is full; and
   transport the first container to the buffer area.

6. The autonomous robot of claim 5, wherein the second container is transported while the first container is being filled.

7. The autonomous robot of claim 5, wherein the one or more computer processors are further configured to execute the computer-executable instructions to:
   determine a time sensitivity metric associated with a third container; and
   transport the third container directly to the packing station while bypassing the buffer area based at least in part on the time sensitivity metric.

8. The autonomous robot of claim 5, wherein the one or more computer processors are further configured to execute the computer-executable instructions to:
   determine that a packing station has an opening; and
   transport the second container from the buffer area to the packing station.

9. The autonomous robot of claim 5, wherein the one or more computer processors are further configured to execute the computer-executable instructions to:
   retrieve a third container from the buffer area, wherein the third container is empty; and
   transport the third container to the pick docking station.

10. The autonomous robot of claim 5, wherein the autonomous robot comprises one or more forks.

11. The autonomous robot of claim 10, wherein the first container is a cage comprising fencing along three walls, an open fourth wall, and a platform having slots configured to receive the one or more forks.

12. The autonomous robot of claim 5, wherein the second container is full of items individually weighing at least 20 pounds.

13. The autonomous robot of claim 5, wherein the one or more computer processors are further configured to execute the computer-executable instructions to:
   coordinate transport of the first container with a fleet of autonomous robots.

14. A method for transporting bulky items by an autonomous robot, the method comprising:
   determining, by a controller, that a first container is empty;
   transporting the first container to a pick docking station;
   retrieving a second container from an induct station, wherein the second container is full;

transporting the second container to a buffer area;
determining, by the controller, that the first container is full; and
transporting the first container to the buffer area.

15. The method of claim 14, wherein the second container is transported while the first container is being filled.

16. The method of claim 14, further comprising:
determining, by the controller, a time sensitivity metric associated with a fourth container; and
transporting the fourth container directly to the packing station while bypassing the buffer area based at least in part on the time sensitivity metric.

17. The method of claim 14, further comprising:
determining, by the controller, that a packing station has an opening; and
transporting the second container from the buffer area to the packing station.

18. The method of claim 14, further comprising:
retrieving a third container from the buffer area, wherein the third container is empty; and
transport the third container to the pick docking station.

19. The method of claim 14, further comprising:
coordinating, by the controller, transport of the first container with a fleet of autonomous robots.

20. The method of claim 14, wherein the first container is a cage comprising fencing along three walls, an open fourth wall, and a platform having slots configured to receive the one or more forks.

* * * * *